(12) United States Patent
Maguire et al.

(10) Patent No.: US 7,699,746 B2
(45) Date of Patent: Apr. 20, 2010

(54) ONE WAY CLUTCH AND SYNCHRONIZER ASSEMBLY

(75) Inventors: Joel M. Maguire, Northville, MI (US); Scott H. Wittkopp, Ypsilanti, MI (US); James M. Hart, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 462 days.

(21) Appl. No.: 11/769,965

(22) Filed: Jun. 28, 2007

(65) Prior Publication Data

US 2009/0005212 A1  Jan. 1, 2009

(51) Int. Cl.
*F16H 3/44* (2006.01)
*F16H 57/10* (2006.01)
*F16D 41/12* (2006.01)
*F16D 23/04* (2006.01)

(52) U.S. Cl. ......................... 475/324; 192/46; 192/53.5; 192/69.1; 188/82.74

(58) Field of Classification Search ................ 475/261, 475/262, 296, 303, 324; 192/53.1, 53.5, 192/46, 69.1; 188/82.74
See application file for complete search history.

(56) References Cited

U.S. PATENT DOCUMENTS

| | | | | |
|---|---|---|---|---|
| 2,540,154 A | * | 2/1951 | Winder | 475/7 |
| 5,156,575 A | * | 10/1992 | Garrett | 475/59 |
| 6,244,965 B1 | * | 6/2001 | Klecker et al. | 464/81 |
| 2006/0278486 A1 | * | 12/2006 | Pawley et al. | 192/43.1 |
| 2008/0223681 A1 | * | 9/2008 | Stevenson et al. | 192/43 |

* cited by examiner

*Primary Examiner*—Richard M. Lorence
*Assistant Examiner*—Edwin A. Young

(57) ABSTRACT

A one way clutch and synchronizer assembly includes a stationary member having a plurality of clutch struts and camming surfaces, a second circular selector member, an third rotating controlled member and a fourth stationary member. The selector member includes apertures or windows through which the clutch struts may pass to engage the rotating member and camming surfaces which provide a selective frictional coupling between the stationary members and the rotating member. A bi-directional hydraulic or electric actuator selectively, bi-directionally rotates the selector member.

18 Claims, 3 Drawing Sheets

ONE WAY CLUTCH AND SYNCHRONIZER ASSEMBLY

FIELD

The present disclosure relates to torque transmitting devices and more particularly to a selectively engageable one way clutch and synchronizer assembly.

BACKGROUND

The statements in this section merely provide background information related to the present disclosure and may or may not constitute prior art.

Modern multiple speed automatic transmissions commonly employ a plurality of planetary gear sets having sun gears, planet gear carriers and ring gears which are permanently coupled together or selectively interconnected by clutches or grounded by brakes to achieve reverse gear and a plurality of forward gear ratios.

While the foregoing described components provide the fundamental and necessary reverse and forward speeds or gear ratios, automatic transmissions must also include control devices and components which select the desired or required gear ratio and facilitate shifts, both when the vehicle speed is increasing (upshifts) and when the vehicle speed is decreasing (downshifts).

A downshift may be required and may occur during two primary operating conditions: when the driver signals the engine and control components that rapid acceleration is desired, for example, in a passing situation, by fully depressing the accelerator pedal and when the vehicle is coasting and decelerating. In the former condition, there is invariably sufficient data available upon which the control components will base a decision to command a downshift. In the latter condition, however, the data will be more subtle and the decision to downshift as well as the transmission components which affect the downshift must operate smoothly and with a minimum of torque flow disruption.

The present invention is directed to a one way clutch and synchronizer having particular applicability to automatic transmissions which provides smooth and improved downshifts during periods of vehicle coasting and deceleration.

SUMMARY

The present invention provides a one way clutch and synchronizer assembly which includes a first stationary member having a plurality of clutch sprags or struts and a plurality of ramps or camming surfaces, a second selector plate or member, a third adjacent rotating controlled member and a fourth adjacent stationary member. The selector plate includes apertures or windows through which the clutch struts may pass and ramps or camming surfaces which cooperate with the ramps or camming surfaces on the first member to provide a selective frictional coupling between the stationary members and the rotating member. A bidirectional hydraulic or electric actuator selectively, bi-directionally rotates the selector plate. In a first position of the selector plate, the clutch struts are retracted and there is essentially no frictional contact between the selector plate and the stationary and rotating members and thus the rotating member may freely rotate. In a second or intermediate position, the ramps or camming surfaces of the selector plate provide frictional coupling between the stationary and rotating members to reduce the speed of the rotating member. In a third or engaged position, the windows of the selector plate align with the clutch struts, allowing them to pivot and engage the rotating member and inhibit its rotation in one direction. The one way clutch and synchronizer according to the present invention find application in multiple speed automatic transmissions to improve coasting downshifts.

Thus it is an object of the present invention to provide a one way clutch and synchronizer assembly.

It is a further object of the present invention to provide a one way clutch and synchronizer assembly having a bidirectional actuator.

It is a still further object of the present invention to provide a one way clutch and synchronizer assembly having a fixed member having at least one sprag or strut.

It is a still further object of the present invention to provide a one way clutch and synchronizer assembly having a rotating intermediate member having at least one aperture or window and ramps or camming surfaces.

It is a still further object of the present invention to provide a one way clutch and synchronizer assembly having applicability in multiple speed automatic transmissions.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The same reference number appearing in the several views refers to the same component, element or feature.

DETAILED DESCRIPTION

The following description is merely exemplary in nature and is not intended to limit the present disclosure, application, or uses.

Figure 1:
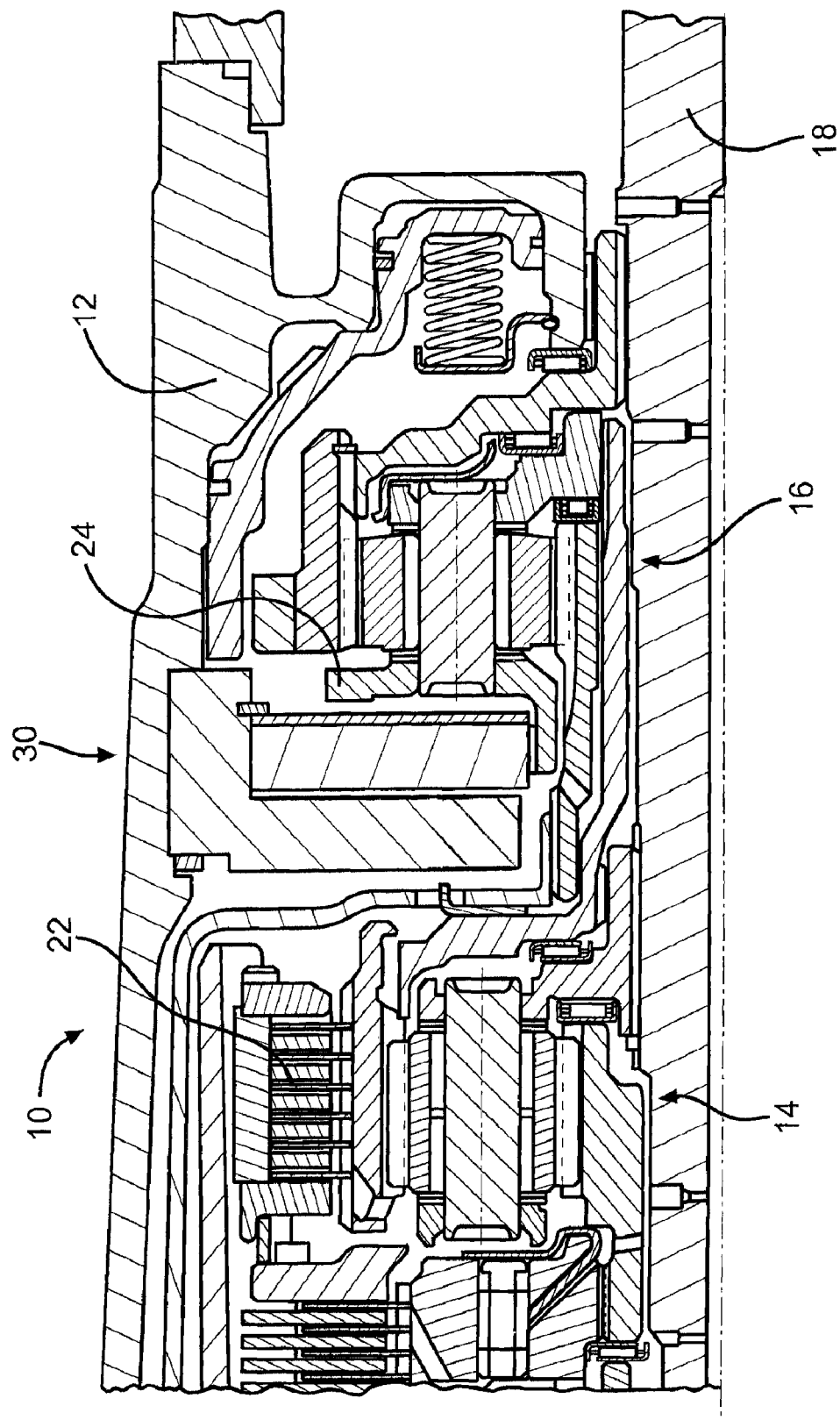
FIG. 1 is a fragmentary, sectional view of a multiple speed automatic transmission embodying the present invention.

With reference to FIG. 1, a multiple speed automatic transmission incorporating the present invention is illustrated and generally designated by the reference number 10. The automatic transmission 10 includes a stationary housing 12 having a plurality of openings, shoulders, flanges, ports and other features which support, locate and secure various components of the automatic transmission 10. Among these components are a first planetary gear assembly 14 and a second planetary gear assembly 16 which are concentrically disposed about an output shaft 18. A first clutch 22 selectively couples a member of the first planetary gear assembly 14. The second planetary gear assembly 16 includes a planet gear carrier 24. A one way clutch and synchronizer assembly 30 according to the present invention is operably disposed between the planet gear carrier 24 and the stationary housing 12.

Figure 2:
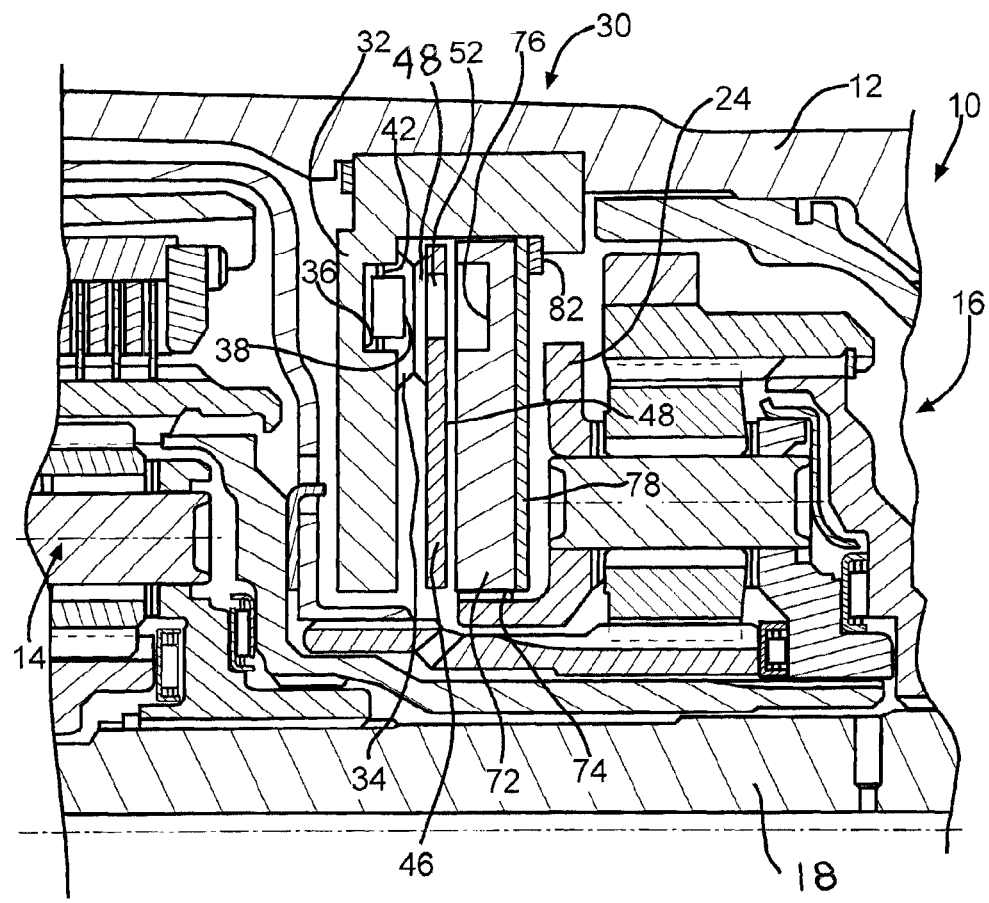
FIG. 2 is an enlarged, fragmentary sectional view of a one way clutch and synchronizer according to the present invention.

Referring now to FIG. 2, the one way clutch and synchronizer assembly 30 includes a first, preferably circular, member or disc 32 which is concentrically disposed about the output shaft 18. The first circular disc 32 includes a plurality of curved ramps or camming surfaces 34. Also disposed generally tangentially in shallow recesses 36 in the circular disc 32 are a plurality of clutch sprags or struts 38. The sprags or struts 38 are pivoted about pivot pins 42 which are part of sprag 28 or pivotally mounted by any other suitable means.

Figures 3A, 3B:
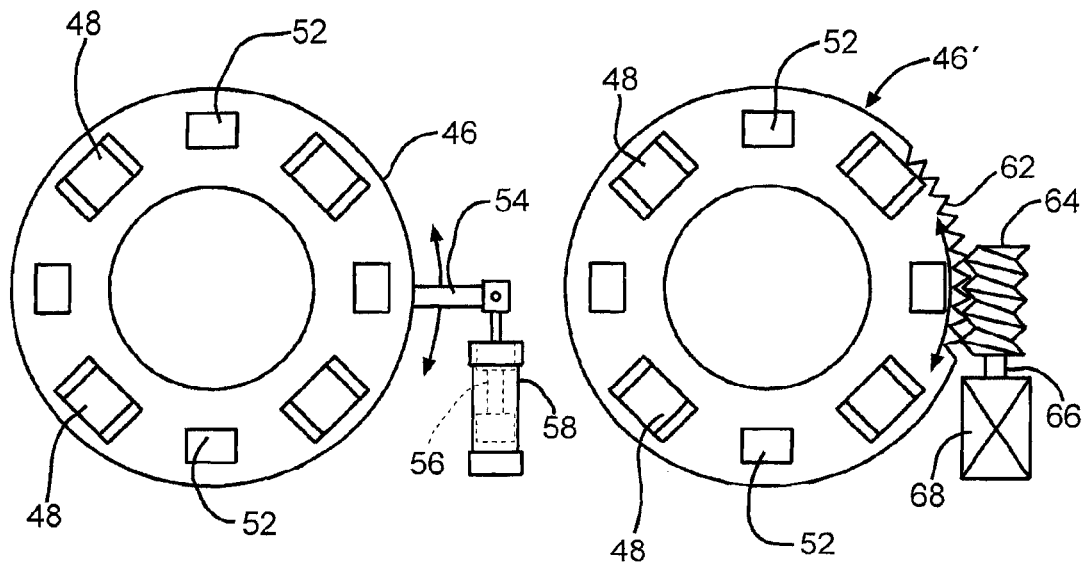
FIG. 3A is a plan view of a selector plate and hydraulic actuator according to one embodiment of the present invention.
FIG. 3B is a plan view of a selector plate and electric actuator according to another embodiment of the present invention.

Referring now to FIGS. 2 and 3A, adjacent the first circular member or disc 32 is a second, preferably circular, steering or selector member or plate 46 which is also concentrically disposed about the output shaft 18. The circular steering or selector plate 46 includes a plurality of curved ramps or camming surfaces 48 opposed, corresponding to and aligned with the ramps or camming surfaces on the first circular member or disc 32. Relative rotation between the first circular disc 32 and the second circular selector plate 46 causes the pluralities of ramps or camming surfaces 34 and 48 to engage one another and translate the second circular member or selector plate 46 to the right as illustrated in FIG. 2. The second circular member or selector plate 46 also defines a plurality of apertures or windows 52 which are radially aligned with the clutch sprags or struts 38. The apertures or windows 52 are preferably rectangular or square and are wider than the clutch sprags or struts 38 to facilitate ready and unhindered movement of the sprags or struts 38 therethrough.

As illustrated in the embodiment of FIG. 3A, the second circular member or selector plate 46 also includes a radially extending arm or lever 54. The arm or lever 54 is coupled to a piston or valve 56 of a hydraulic cylinder 58. Application of pressurized hydraulic fluid from a controlled source (not illustrated) to opposite faces of the piston 56 translates the piston 56 bi-directionally thereby rotating the circular selector plate 46 about its axis defined by the output shaft 18.

With reference to another embodiment of the second circular member or selector plate 46' illustrated in FIG. 3B, it also includes the ramps or camming surfaces 48 and the windows or apertures 52. To achieve rotational movement, the second circular member or selector plate 46' includes gear teeth 62 over a portion of its periphery which are in constant mesh with a worm gear 64 coupled to and driven by the output shaft 66 of a bi-directional electric motor and gear reduction assembly 68. It will be appreciated that bidirectional rotation of the electric motor assembly 68 bi-directionally rotates the circular selector plate 46' about its axis. Utilization of the worm gear 64 essentially eliminates backdriving of the electric motor assembly 68 and thus obviates the need to constantly supply electrical energy to the electric motor assembly 68 to maintain the position of the second circular member or selector plate 46'.

With reference again to FIG. 2, the one way clutch and synchronizer assembly 30 also includes a third, preferably circular, member or disc 72 adjacent the second member or selector plate 46 and concentrically disposed about the output shaft 18. The third circular member or disc 72 is coupled for rotation with the planet gear carrier 24 of the second planetary gear assembly 16 by interengaging splines or gear teeth 74 or other suitable means. The third circular member or disc 72 includes a plurality of square or rectangular recesses 76 which are radially aligned with the clutch struts 38 and the windows 52 such that they may be engaged by the struts 38. A fourth, preferably circular, stationary flat friction member or disc 78 is located on the backside of the third circular member or disc 72 and both are restrained against axial motion in one direction by a retaining snap ring 82. One of the opposing faces of the third circular member or disc 72 and the fourth stationary member or disc 78 may include clutch friction material or facing (not illustrated).

Figures 4, 5, 6:
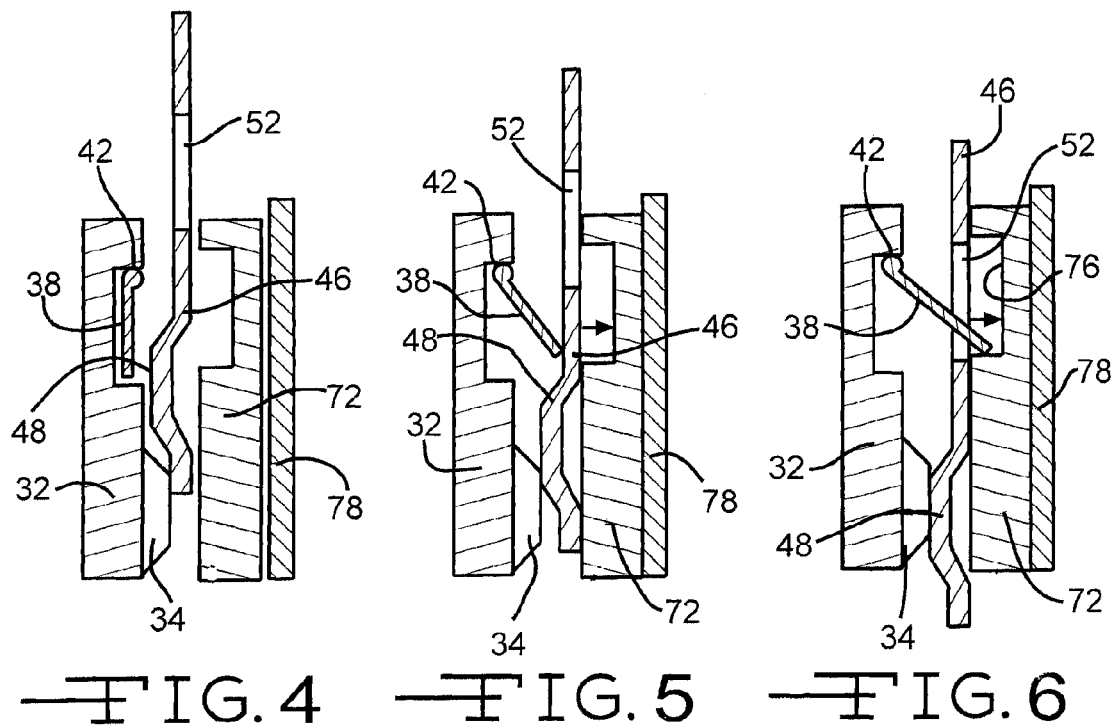
FIG. 4 is a schematic, linear representation of a one way clutch and synchronizer according to the present invention in a quiescent or de-activated state.
FIG. 5 is a schematic, linear representation of a one way clutch and synchronizer according to the present invention in a synchronizing or braking state.
FIG. 6 is a schematic, linear representation of a one way clutch and synchronizer according to the present invention in a one way clutching state.

The operation of the one way clutch and synchronizer assembly 30 will now be described with reference to FIGS. 2, 4, 5, 6 and 7. In FIG. 4, the components of the one way clutch and synchronizer assembly 30 are in their quiescent or non-engaged state. There is no significant contact between the ramps 34 of the first circular member or disc 32 and the ramps 48 of the second member or selector plate 46 and the clutch struts 38 are fully retracted.

In FIG. 5, the second circular member or selector plate 46 has been rotated by the hydraulic piston 58 (or the electric motor assembly 68) so that the ramps or camming surfaces 34 on the first circular disc 32 and the ramps or camming surfaces 48 on the second member or selector plate 46 engage and translate the second selector plate 46 and the third circular disc 72 into frictional contact with the fourth stationary friction disc 78 thereby causing drag and reducing the speed of the third circular member or disc 72. Since the third circular member or disc 72 is coupled to the planet gear carrier 24 of the second planetary gear assembly 16, the speed of this component also begins to drop.

In FIG. 6, the second member or selector plate 46 has rotated farther such that the clutch sprags or struts 38 have extended through the apertures or windows 52 and engaged the recesses 76 in the third circular member or disc 72. At this time, rotation of the third circular disc 72 in one direction is positively inhibited by cooperation between the clutch struts 38 and the recesses 76 such that the planet gear carrier 24 also cannot rotate in one direction.

Figure 7:
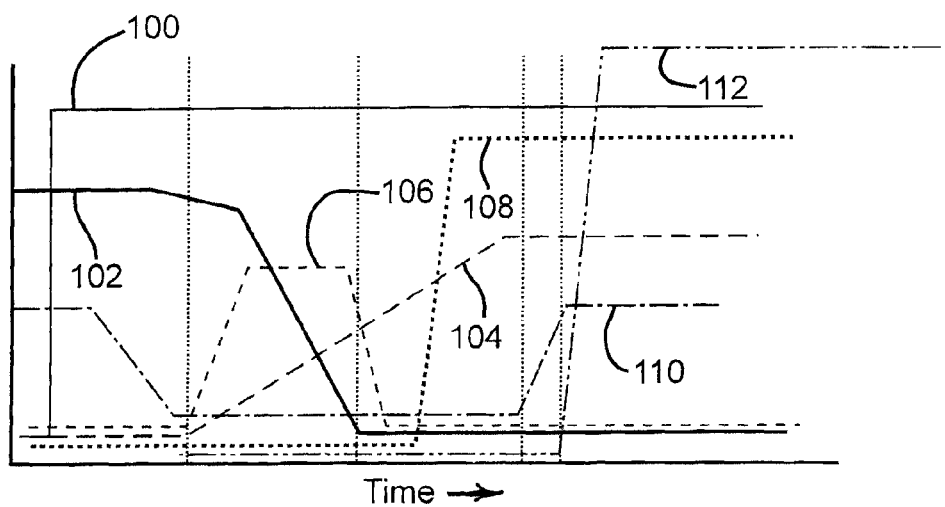
FIG. 7 is a chart depicting operation of a one way clutch and synchronizer according to the present invention in conjunction with an automatic transmission.

FIG. 7 relates the operation of a one way clutch and synchronizer assembly 30 according to the present invention to the operation of a multiple speed automatic transmission such as the transmission 10. The chart of FIG. 7 presents the states or conditions of seven operating parameters with time as the horizontal scale after a coast down shift has been requested as indicated by the "high" or "on" state of a line 100. A line 102 represents the speed of the planet gear carrier 24 which, of course, is also the speed across the frictional interface between the rotating third circular disc 72 and the stationary fourth friction disc 78. As the second member or selector plate 46 begins to rotate as indicated by the increase in the height of a line 104, the frictional torque or drag between the rotating and stationary members increases as illustrated by a line 106.

Rather quickly, the rotational speed of the third circular member or disc 72 and the planet gear carrier 24 drop to zero as indicated by the line 102. When this rotational speed drops to zero, the frictional torque or drag as indicated by the line 106 also drops to zero. As the second member or selector plate 46 continues to rotate, as indicated by the increasing height of the line 104, the clutch sprags or struts 38 move from retracted (low) to extended (high) positions as illustrated by a line 108. A line 110 represents the input clutch capacity which at this time is at a neutral idle capacity (low). As the clutch struts 38 engage, however, the torque capacity of the input clutch increases as is also indicated by the line 110. As this occurs, a line 112 represents the engine retarding torque which is now available to decelerate the vehicle (or maintain its speed going downhill) due to the executed downshift. It will thus be appreciated that the action of the one way clutch and synchronizer assembly 30 according to the present invention facilitates a smooth downshift and, in the lower gear, increased engine braking.

The description of the invention is merely exemplary in nature and variations that do not depart from the gist of the invention are intended to be within the scope of the invention. Such variations are not to be regarded as a departure from the spirit and scope of the invention.

What is claimed is:

1. A one way clutch and synchronizer assembly comprising, in combination,
    a first stationary member having a plurality of clutch struts and a first plurality of ramps,
    a second rotatable member adjacent said first member having a second plurality of ramps facing said first plurality of ramps and a plurality of apertures,
    an actuator for bi-directionally rotating said second member,
    a third rotatable member adjacent said second member having a plurality of features adapted to engage said clutch struts, and
    a fourth stationary member adjacent said third member,
    whereby rotation of said second member synchronizes said third and said fourth members and aligns said apertures with said clutch struts.

2. The one way clutch and synchronizer assembly of claim 1 wherein said clutch struts are movable from a first retracted position to a second engaged position.

3. The one way clutch and synchronizer assembly of claim 1 wherein said third member is coupled to a component of an automatic transmission.

4. The one way clutch and synchronizer assembly of claim 3 wherein said component of said automatic transmission is a planetary gear assembly.

5. The one way clutch and synchronizer assembly of claim 3 wherein said component of said automatic transmission is a planet gear carrier of a planetary gear assembly.

6. The one way clutch and synchronizer assembly of claim 1 wherein said clutch struts are pivotally connected to said first member.

7. The one way clutch and synchronizer assembly of claim 1 wherein said actuator includes a bidirectional electric motor and worm gear assembly.

8. The one way clutch and synchronizer assembly of claim 1 wherein said actuator includes a hydraulic piston and cylinder assembly.

9. The one way clutch and synchronizer assembly of claim 1 wherein said second rotatable member is a selector plate.

10. A one way clutch and synchronizer assembly comprising, in combination,
    a first stationary member having a plurality of clutch sprags and a first plurality of camming surfaces,
    a second rotatable member adjacent said first member having a second plurality of camming surfaces opposite said first camming surfaces and a plurality of windows,
    means for bi-directionally rotating said second member,
    a third rotatable member adjacent said second member having a plurality of sprag receiving recesses and
    a fourth stationary member adjacent said third member.

11. The one way clutch and synchronizer assembly of claim 10 wherein said first, second, third and fourth members are circular.

12. The one way clutch and synchronizer assembly of claim 10 wherein said means for bi-directionally rotating said second member includes a bi-directional electric motor and worm gear assembly.

13. The one way clutch and synchronizer assembly of claim 10 wherein said means for bi-directionally rotating said second member includes a hydraulic piston and cylinder assembly.

14. The one way clutch and synchronizer assembly of claim 10 wherein said clutch sprags are movable from a first, retracted position to a second, engaged position.

15. The one way clutch and synchronizer assembly of claim 10 wherein said third rotatable member is coupled to a component of an automatic transmission.

16. The one way clutch and synchronizer assembly of claim 15 wherein said component of said automatic transmission is a planet gear carrier of a planetary gear assembly.

17. The one way clutch and synchronizer assembly of claim 10 wherein said members are concentrically disposed about a shaft of an automatic transmission.

18. The one way clutch and synchronizer assembly of claim 10 wherein said second rotatable member is a selector plate.

* * * * *